United States Patent [19]

Liu et al.

[11] 4,372,643
[45] Feb. 8, 1983

[54] STANDING-WAVE, VELOCITY-MATCHED GATE

[75] Inventors: Pao-Lo P. Liu, Eatontown; Enrique A. Marcatili, Rumson, both of N.J.

[73] Assignee: Bell Telephone Laboratories, Incorporated, Murray Hill, N.J.

[21] Appl. No.: 161,761

[22] Filed: Jun. 23, 1980

[51] Int. Cl.³ .............................................. G02B 5/174
[52] U.S. Cl. .................................................. 350/96.14
[58] Field of Search ............... 350/96.12, 96.13, 96.14, 350/96.15

[56] References Cited

U.S. PATENT DOCUMENTS

| 4,005,927 | 2/1977 | Caton | 350/96.14 |
| 4,243,295 | 1/1981 | Alferness | 350/96.14 |
| 4,251,130 | 2/1981 | Marcatili | 350/96.14 |
| 4,262,993 | 4/1981 | Burns et al. | 350/96.14 |

OTHER PUBLICATIONS

Kogelnik et al., "Switched Directional Couplers With Alternating $\Delta\beta$", IEEE J. Q. E., vol. QE-12, No. 7, Jul. 1976, pp. 396-401.
Alferness, "Optical Directional Couplers With Weighted Coupling," A. P. L., vol. 35, No. 3, Aug. 1979, pp. 260-262.
Marcatili, "An Integrated-Optics Sub-Picosecond Gate," Int. & Guided Wave Optics Tech. Digest, Jan. 1980, Paper TUE3, 4 pages.
Marcatili, "Optical Subpicosecond Gate," Applied Optics, vol. 19, No. 9, May 1980, pp. 1468-1476.

Primary Examiner—John D. Lee
Attorney, Agent, or Firm—Sherman, S.

[57] ABSTRACT

An ultrafast gate is produced by locally modulating the coupling along a pair of coupled wavepaths (11, 12) by means of a standing-wave electrical signal. By resolving the electrical signal into two, oppositely travelling waves propagating at the same velocity as the signal in the coupled wavepaths, it can be shown that the effect is to simulate an alternating $\Delta\beta$ coupler. It is further shown that side lobes in the output signal can be reduced by tapering the coupling along the coupling interval.

11 Claims, 7 Drawing Figures

4,372,643

STANDING-WAVE, VELOCITY-MATCHED GATE

TECHNICAL FIELD

This invention relates to ultrafast gates.

BACKGROUND OF THE INVENTION

In the copending application by E. A. J. Marcatili entitled "Velocity Matched Optical Gate," Ser. No. 58,744, filed July 18, 1979, (now U.S. Pat. No. 4,251,130) a travelling-wave, velocity-matched optical gate (TW-VMG) is described wherein a travelling electrical signal is employed to locally control the coupling characteristic along an optical directional coupler. In particular, it is shown that ultrafast gating can be realized by means of a simple sine wave when the electric signal travels in synchronism with the optical signal.

To avoid spurious coupling effects, the electric signal path is advantageously terminated by means of a matching impedance. In this manner, reflections at the termination are avoided. It has been found, however, that it is relatively difficult to terminate the electric signal path in a manner which completely avoids reflections. In addition, when terminated in this manner, the electric circuit continuously consumes relatively large amounts of signal power.

SUMMARY OF THE INVENTION

The present invention is based upon the discovery that it is not necessary to match-terminate the electric wave path. Indeed, an efficient optical gate can be realized when the electric signal path is completely mismatched, ($\Gamma=1$), giving rise to a standing wave along the path. Thus, in accordance with the present invention, a resonant electric signal circuit is employed instead of a match-terminated transmission line. This has the advantage of generating large amplitude signals while consuming relatively little signal power. In addition, it has been found that by tapering the optical coupling, side lobes in the optical output pulses can be suppressed.

DETAILED DESCRIPTION

Figure 1:
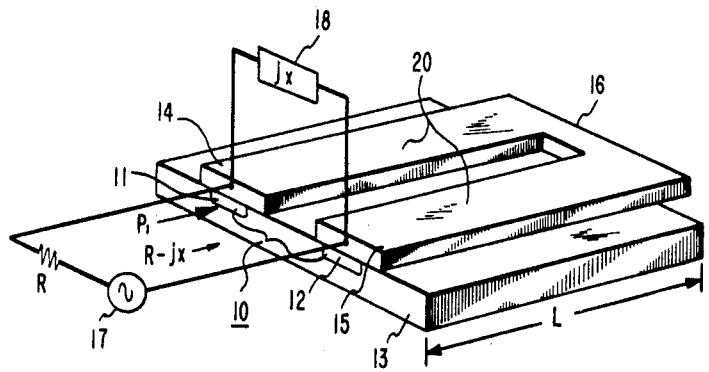
FIG. 1 shows a first embodiment of a standing-wave, velocity-matched gate (SW-VMG) in accordance with the invention.

Referring to the drawings, FIG. 1 shows a standing-wave, velocity-matched gate (SW-VMG), in accordance with a first embodiment of the present invention, comprising an optical directional coupler 10 and electrodes 14 and 15. Coupler 10 comprises a pair of substantially identical dielectric waveguides 11 and 12 embedded in an electrooptic substrate 13 of lower refractive index. The guides are in coupling relationship over an interval L which will be defined in greater detail hereinbelow.

Modulating means for varying the coupling between the guides comprises electrodes 14 and 15 which, in the illustrative embodiment of FIG. 1, are located directly over waveguides 11 and 12, respectively. As is evident, however, other electrode configurations for modulating the coupling between guides 11 and 12 can be employed.

The electrodes 14 and 15 form an electrical transmission line 20 that is energized at its input end by means of a signal source 17, such as a sine wave generator, having an output impedance R. In the above-identified Marcatili application, the transmission line is advantageously designed to have a characteristic impedance $Z_c=R$, and is terminated by a matching impedance R. In accordance with a first illustrative embodiment of the present invention, transmission line 20 is terminated by means of a short-circuit 16, and the electrodes are proportioned such that the input impedance of line 20 has a real part that is equal to R. The imaginary component of the line input impedance is resonated by an external impedance 18 connected across the input end of the line. Thus, for example, a line having an input impedance R-jx would be tuned by means of an external impedance jx. The result of the above arrangement is to provide a resonant line whose input impedance matches signal source 17. When energized, a standing wave is produced along the length of the electrodes which locally affects the coupling between the optical waveguides.

As will be illustrated hereinbelow, the electrodes can, alternatively, be terminated by means of an open circuit. More generally, any reactive (i.e., lossless) termination can be employed.

Figure 2:
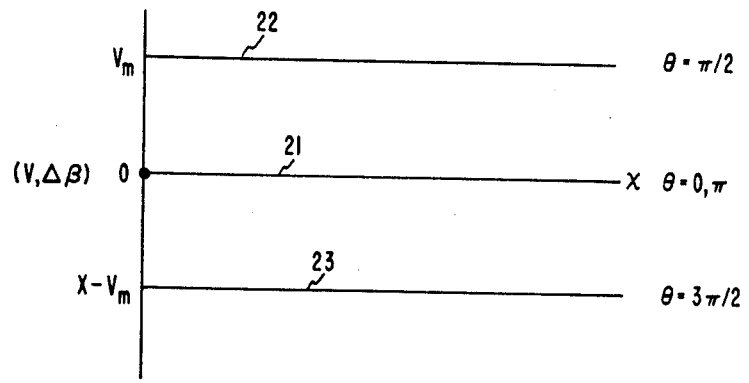
FIGS. 2 and 3, included for purposes of explanation, show the variation of $\Delta\beta$ as a function of modulating voltage for the TW-VMG and the SW-VMG.

In the absence of a modulating signal from source 17, an optical signal $P_1$ applied to one end of waveguide 11 couples between waveguides 11 and 12. By the appropriate selection of length L, all of the incident signal $P_1$ can be coupled to waveguide 12. If, however, an electric field is applied between the electrodes, the propagation constants $\beta_1$ and $\beta_2$ of waveguides 11 and 12 are locally perturbed due to the electrooptic effect. Thus, at any point x along the coupler, the propagation constants $\beta_1$ and $\beta_2$ vary as a function of time t. For purposes of explanation let us first consider the operation of the prior art gate wherein the modulating signal is a travelling wave which propagates along the electrodes in synchronism with the optical signal. Because of this synchronism, the modulating voltage seen by photons as they propagate along waveguides 11 and 12 remains a constant value that is equal to the modulating voltage at the instant the photons entered the coupler. Thus, if the instantaneous voltage is zero at the instant the photons entered waveguide 11, the propagation constants $\beta_1$ and $\beta_2$ of the two waveguides are, and remain equal as to these photons, and efficient coupling between the guides results. The local voltage, and the corresponding $\Delta\beta=(\beta_1-\beta_2)$ for the instant $\theta=0$ as a function of distance x along the waveguides is illustrated by curve 21 in FIG. 2. At a later instant, corresponding to a quarter of the modulating signal cycle ($\theta=\pi/2$), the instantaneous voltage at the input to the electrodes is a maximum, $V_m$, as indicated by curve 22, and remains so along the entire length of waveguide 11 with regard to those photons entering the system at this later time. As a consequence, a large $\Delta\beta$ is produced which is sufficiently large to prevent coupling between guides 11 and 12. At times corresponding to $\theta = \pi$, $2\pi$, $3\pi$, etc., the voltage is again zero, while at times $\theta = \pi/2$, $3\pi/2$, $5\pi/2$, etc., the voltage is very large, as indicated by curves 22 and 23. Thus, efficient coupling occurs only when the modulating signal is at a zero crossover point in its cycle, which occurs twice each period.

Figure 3:
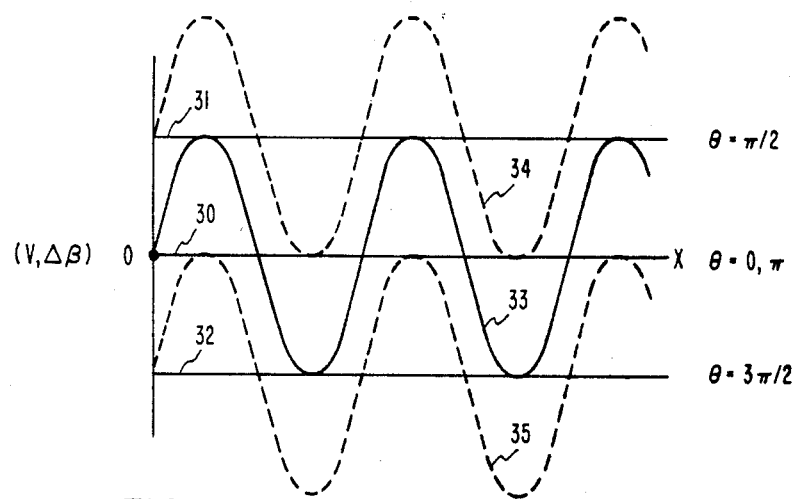

In the instant case, the situation is somewhat more complicated. However, one can readily visualize how a standing-wave gate operates by resolving the standing wave into its two travelling wave components. One wave propagates in the direction of, and in synchronism with the optical wave, as described hereinabove. The voltage conditions thus encountered by the optical wave can, accordingly, be indicated by curves similar to those shown in FIG. 2. Accordingly, curves 30, 31 and 32 in FIG. 3 indicate the $\Delta\beta$ conditions attributable to the forward travelling modulating wave.

By contrast, the reflected wave, being completely out of synchronism with the optical wave presents the optical wave with constantly changing local conditions. These variations are superimposed upon the structure to produce the new $\Delta\beta$ conditions represented by the sinusoidal curves 33, 34 and 35, assuming lossless conditions. Clearly, the $\Delta\beta$ conditions along the optical wavepaths in a standing-wave, velocity-matched gate is relatively complex. However, it will be noted that with respect to curves 34 and 35, i.e., those with large dc components, the $\Delta\beta$ is always positive (as for curve 34), or always negative (as for curve 35). Thus, the integrated effect over the coupling interval is to preclude coupling between the guides. On the other hand, with respect to curve 33, the $\Delta\beta$ alternates between $\pm\Delta\beta$ and $\mp\Delta\beta$. The result is to produce the equivalent of an alternating $\Delta\beta$ coupler of the type described by H. Kogelnik and R. V. Schmidt in their article "Switched Directional Coupler with Alternating $\Delta\beta$," published in the July 1976 issue of the *IEEE Journal of Quantum Electronics*, Vol. QE-12, No. 7, pp. 396–401. As disclosed in this article, complete coupling of optical power between waveguides can be realized with sections of alternating phase mismatch, and this is precisely the condition that obtains in an SW-VMG in accordance with the present invention.

Figure 4:
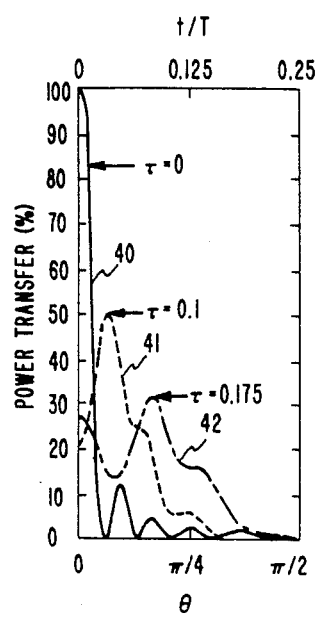
FIG. 4 shows the variation in power transfer as a function of velocity mismatch.

As in the case of a TW-VMG, the narrowest pulses (fastest gate) is obtained when the modulation signal and the optical signal are velocity-matched. FIG. 4 shows the effect upon the power transfer for different amounts of mismatch, $\tau$, where:

$$\tau = \left(1 - \frac{V_m}{V_g}\right) \frac{L}{\lambda_m}; \quad (1)$$

L is the length of the coupler;
$\lambda_m$ is the wavelength of the modulating signal in the electrodes;
and $V_m$ and $V_g$ are the velocities of the modulating and optical signals.

Curve 40 shows the power transfer as a function of the phase of the modulating signal $\theta$ as seen by the entering photons for $\tau = 0$. Curves 41 and 42 are the results for $\tau = 0.1$ and 0.175, respectively. It will be noted that as the mismatch increases, the power transferred at $\theta = 0$ decreases rapidly, and the side lobes ($\theta \neq 0$) increase significantly.

Figure 5:
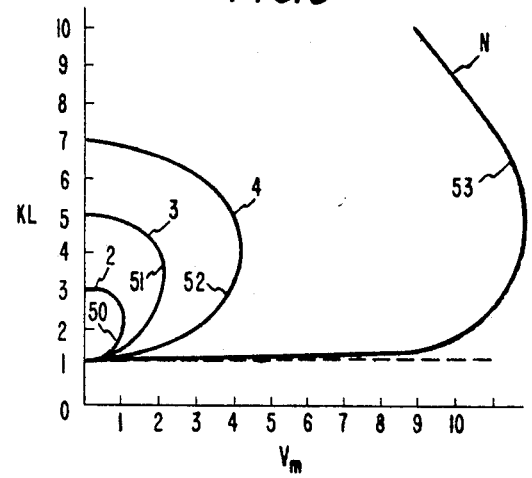
FIG. 5 shows the transfer curves for different alternating $\Delta\beta$ couplers.

If the modulating signal is a simple sine wave, the slope at the zero crossover point increases as the amplitude of the sine wave increases. That is, the pulse width decreases as the amplitude of the modulating signal is increased. Thus, in the prior art VMG, increasing the modulating signal (within the limits of voltage breakdown) provides a convenient means of narrowing the output pulses. However, in the SW-VMG, the situation is more complex. As indicated in the explanation hereinabove, a gate in accordance with the present invention is the equivalent of a plurality of alternating $\Delta\beta$ couplers. For such devices, the switching diagrams are of the form shown in FIG. 5, where the abscissa is proportional to the applied voltage, and the ordinate is a function of the coupler length. For example, curve 50 is the switching diagram for a coupler with two sections of alternating $\Delta\beta$. This curve gives the loci of points for complete power transfer. As indicated, there is a range of voltages corresponding to different coupler length for which full transfer can be realized. Thus, for a coupler of given length, the amplitude of the modulating signal cannot be increased arbitrarily. If a greater range of amplitudes is desired, additional $\Delta\beta$ sections must be added, as indicated by curves 51, 52 and 53, which show the transfer curves for 3, 4 and N $\Delta\beta$ sections. As is clearly indicated, $V_m$ can be increased significantly, without departing from the curves, the greater the number of sections. Thus, an SW-VMG advantageously includes a large number of $\Delta\beta$ sections. Inasmuch as the latter is a function of both the length of the coupler and the modulating frequency, either or both of these parameters can be increased as a means of increasing the number of sections.

Thus, in summary, the design of an SW-VMG involves selecting the coupler length L, and, with this given, the number N, of $\Delta\beta$ sections is defined by $$N = 4L/\lambda_m \quad (2)$$

The maximum modulating signal amplitude $V_m$ is then $$V_m \leq N\pi/L \quad (3)$$

where $$V_m = 4\pi\Delta n/\lambda; \quad (4)$$

$\Delta n$ is the refractive index change induced in the electrooptical material;
and $\lambda$ is the wavelength of the light in free space.

For the shortest possible output pulses, one would advantageously use the longest coupler length, the highest modulating frequency and the largest amplitude modulating signal.

It will be recognized that so long as an ac modulating signal is applied to the electrodes, the gate produces output pulses. If the ac modulating signal is replaced with a dc bias, no gating action occurs, and no pulses are generated. Thus, the train of output pulses can be turned on and off by the expedient of switching between an ac modulating signal and a dc bias voltage.

Figure 6:
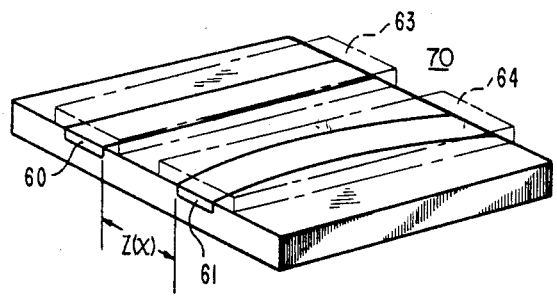
FIG. 6 shows an alternate embodiment of the invention employing tapered coupling.
Figure 7:
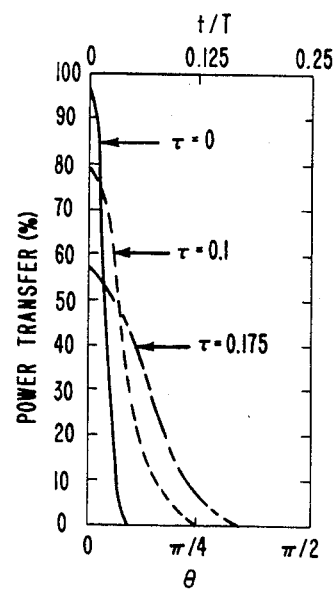
FIG. 7 shows the power transfer curves for the embodiment of FIG. 6.

FIG. 6 shows an alternate embodiment of the invention wherein the coupling between the optical waveguides 60 and 61 is tapered along the coupling interval. As shown in FIG. 4, in the case of uniform coupling, considerable side lobes are produced in the output pulses. Furthermore, these side lobes tend to increase as the velocity mismatch increases. It is, therefore, advantageous that the side lobes be suppressed. This can be done, as illustrated in FIG. 6, by varying the space z between the waveguides as a function of the distance x along the coupler. In the illustrative embodiment, the distance z(x) is a minimum at the coupler center, and increases uniformly towards the ends. Using a raised cosine taper, the power transfer curves shown in FIG. 7 are obtained. While the maximum power transfer still decreases with increasing mismatch, $\tau$, the decrease is less than in the uniformly spaced coupler, and there is no significant side lobe build-up. There is, however, an increase in the pulse width.

FIG. 6 also shows the use of an open-circuit termination of the electrical wavepath 70 formed by electrodes 63 and 64 in place of the short-circuit used in FIG. 1.

It will be recognized that other modulating means and resonating arrangements can just as readily be employed including, for example, conventional metallic waveguides, as was illustrated in the above-cited Marcatili application. Similarly, while the invention has been illustrated with particular reference to optical signals and optical waveguides, the principles of the invention are not limited to any particular waveguide configuration, or to any region of the frequency spectrum.

While not specifically illustrated, it is readily apparent that a standing-wave gate, in accordance with the present invention, can be employed in lieu of the travelling wave gate used in the multiplexer, demultiplexer, power divider and pulse generator disclosed in the above-cited Marcatili application.

We claim:
1. In combination, apparatus including:
a pair of coupled optical wavepaths (11, 12 and 60, 61) and,
means (20, 70), supportive of travelling electrical waves, for locally modulating the coupling between said wavepaths;
Characterized in that said travelling wave means is terminated to produce a standing wave therealong.
2. The combination according to claim 1 wherein said wavepaths (11, 12 and 60, 61) are optical waveguides.
3. The combination according to claim 2 wherein said optical wavepaths comprise a pair of substantially identical dielectric strips embedded in an electrooptic substrate of lower refractive index.
4. The combination according to claim 2 wherein said optical waveguides (11, 12) are uniformly spaced over their coupling interval.
5. The combination according to claim 2 wherein the space (z) between said optical waveguides (60, 61) varies as a function of the distance (x) along their coupling interval.
6. The combination according to claim 1 wherein said travelling wave means (20, 70) is reactively terminated.
7. The combination according to claim 6 wherein said travelling wave means (20) is terminated by means of a short circuit (16).
8. The combination according to claim 6 wherein said travelling wave means (70) is terminated by means of an open circuit.
9. The combination according to claim 1 wherein said travelling means includes a pair of conductive electrodes (14, 15 and 63, 64).
10. The combination according to claim 1 wherein said travelling wave means is a resonant circuit.
11. The combination according to claim 1 including a signal source (17) for energizing said travelling wave means.

* * * * *